United States Patent [19]
Hipsher et al.

[11] 3,928,103
[45] Dec. 23, 1975

[54] HIGH ELONGATION VOIDED ELASTOMERIC BUSHINGS AND METHOD AND MEANS FOR THEIR ASSEMBLING

[75] Inventors: Gary L. Hipsher, Logansport, Ind.; Robert D. Vosburgh, Birmingham, Mich.

[73] Assignee: The General Tire & Rubber Company, Akron, Ohio

[22] Filed: June 7, 1974

[21] Appl. No.: 477,243

Related U.S. Application Data

[62] Division of Ser. No. 330,910, Feb. 9, 1973.

[52] U.S. Cl......... 156/160; 156/293; 29/149.5 NM; 29/451; 29/235; 267/63 R; 267/57.1
[51] Int. Cl.²......................................... B32B 31/20
[58] Field of Search.......... 29/235, 234, 149.5 NM, 29/450, 451; 267/63 R, 57.1; 156/160, 293; 64/27 R

[56] References Cited
UNITED STATES PATENTS

| | | |
|---|---|---|
| 3,345,724 | 10/1967 | Miller et al............................ 29/235 |
| 3,350,767 | 11/1967 | Yannuzzi............................... 29/235 |
| 3,444,609 | 5/1969 | Neidhart et al....................... 29/235 |
| 3,737,973 | 6/1973 | Stawski................................. 29/235 |
| 3,824,660 | 7/1974 | Lowe..................................... 29/235 |

*Primary Examiner*—James B. Marbert
*Attorney, Agent, or Firm*—F. C. Rote, Jr.; James M. Peppers

[57] ABSTRACT

Method for assembling a high elongation voided elastomeric bushing having an elastomeric insert compressively positioned between rigid inner and outer sleeves and elongated greater than 10%. The method for assembling said bushing provides for a spacer member positioned between the insert at the voids and the adjacent sleeve before the insert is compressively positioned between the sleeves. The spacer member is removed after elongation of the insert to provide the assembled bushing, preferably, after bonding of the elastomeric insert to the sleeves. Preferably, the spacer member has a shape substantially conforming to the final shape of the voids of the insert when compressively positioned between the sleeves.

5 Claims, 11 Drawing Figures

HIGH ELONGATION VOIDED ELASTOMERIC BUSHINGS AND METHOD AND MEANS FOR THEIR ASSEMBLING

This is a division of application Ser. No. 330,910 filed Feb. 9, 1973.

FIELD OF THE INVENTION

The present invention relates to a bushing having an elastomeric insert generally concentrically compressed between an inner and outer sleeve and, in particular, to a method of making a voided elastomeric bushing highly elongated in compression.

BACKGROUND OF THE INVENTION

In the isolation of vibration between structural components, it has become well known to use an elastomeric member which is inserted between a pair of concentric rigid sleeves in which the inner sleeve is secured to one structural component and the outer sleeve is secured to another structural component. Originally, these bushings were made by inserting an unsecured molded elastomer between the concentric sleeves and curing the elastomer to bond the components together and relieve the internal stresses within the elastomer. It was later found that load bearing capacities could be increased by using pre-cured elastomeric inserts held under radial compression between the sleeves.

Further improvement was made by molding recesses or voids into the elastomeric insert to provide bushings having spring rates and vibration absorbing capabilities which were different in one radial direction from that in another radial direction. Illustrative of these recessed bushings are U.S. Pat. Nos. 3,082,999, 3,147,964, and 3,642,268, assigned to the assignee of the present invention.

Typically, recessed or voided elastomeric bushings are made by injection, compression or transfer molding the elastomeric insert and curing it at elevated temperatures. The bushing is then assembled on a standard vertical assembly machine, for example as described in U.S. Pat. No. 2,660,780, by first forcing the elastomeric insert into an outer metal sleeve and, thereafter, forcing an inner metal sleeve into the annular opening in the elastomeric insert with a tapered mandrel. Alternatively, the inner sleeve can be first inserted into the elastomeric insert or the elastomeric insert can be compressively forced between the sleeves in a single step. The assembled bushing is allowed to age typically for about 24 hours and is then heated to a temperature of about 285°F. to bond the rubber to the sleeves, which were previously coated with an adhesive that is activated at the elevated temperature.

Voided elastomeric bushings prepared in the above manner provide multiple spring ratings similar to elastomeric bushings assembled under tension. However, voided bushings generally do not have the greater life characteristics associated with compressed non-voided bushings because of the inability to obtain substantial elongation of the elastomeric insert during assembly. Generally, non-voided elastomeric inserts are capable of 100% elongation, while recessed or voided elastomeric inserts are capable of less than about 10% elongation. Thus, while voided elastomeric bushings provide the desired multiple spring ratings, their life characteristics are typically not as good as non-voided bushings.

SUMMARY OF THE INVENTION

The present invention provides a method for assembling voided elastomeric bushings to obtain increased elongation of the insert. The voided elastomeric bushings of the present invention have increased life characteristics as well as a better bond due to the voided elastomeric insert being placed under high compressive loads. The present invention thus provides voided elastomeric bushings having multiple spring rates comparable to bushings assembled under tension and life characteristics comparable to compressed non-voided bushings.

Voided bushings of the present invention are preferably assembled with the use of a spacer member which is adapted to fit between the recesses or voids of the elastomeric insert and an adjacent sleeve of the bushing. If the void is intermediately positioned in the elastomeric insert, the spacer member is adapted to fit therein. The spacer member is preferably made having a shape which substantially conforms to the final shape of the voids which it engages during and after assembly.

Usually, the elastomeric insert includes recesses which are positioned on its outer surface to provide a voided volume between the insert and the outer sleeve. In such a case, the spacer member is adapted to fit within the voided volume which has inner surfaces that substantially conform to the final shape of the recesses after assembly. The spacer member is fitted to the elastomeric insert prior to the forcible insertion of the insert into the outer sleeve. The outer sleeve of the bushing is positioned within an upper nesting member and a lower nesting member is used to force the insert and spacer into the outer sleeve. A tapered mandrel, having the inner sleeve positioned behind it, is then forced through an opening in the insert to position the inner sleeve therein. Upon removal of the mandrel, the insert compressively engages the inner sleeve. The assembled unit, with the spacer member in place within the assembly, is then placed in a bonding oven to bond the elastomeric insert to both the inner and outer sleeves. After the bonding has been effectuated, the unit is taken from the oven and the spacer member removed, for example, by use of a simple press.

Since the present invention provides for the use of a spacer member during assembly to obtain high elongation of a voided elastomeric insert, the precise sequence of the assembling of the bushing is immaterial. Elongations of greater than 10% and up to at least 100% can be achieved by utilization of the spacer member of the present invention. Thus, bushings having voided elastomeric inserts can be made having long life characteristics and multiple spring ratings not hereto found in voided elastomeric bushings.

BRIEF DESCRIPTION OF THE DRAWINGS

The advantages of the present invention will become apparent from a perusal of the following detailed description taken in connection with the accompanying drawings in which.

PRESENTLY PREFERRED EMBODIMENT

Figure 1:
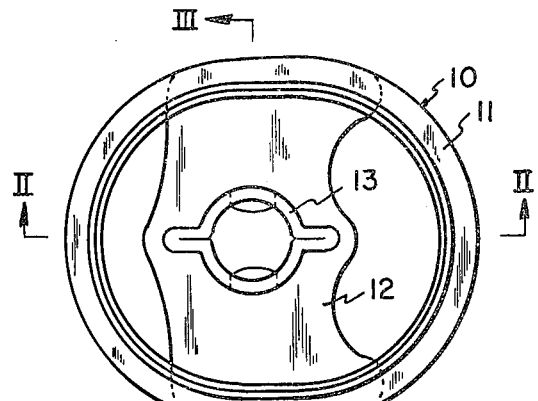
FIG. 1 is a plan view of a bushing having a voided elastomeric insert wherein the voids are positioned adjacent the outer surface of the insert.
Figure 2:
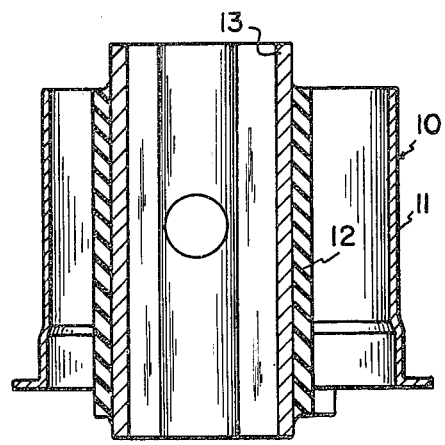
FIGS. 2 and 3 are cross-sections of the bushing shown in FIG. 1 taken along line II—II and III—III of FIG. 1, respectively.
Figure 3:
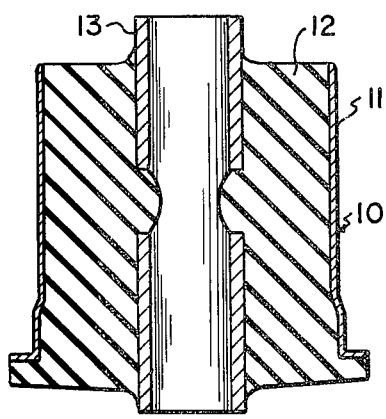

Referring to FIGS. 1, 2 and 3, voided elastomeric bushing 10 comprises an outer rigid sleeve 11 having either an oblong or circular annular cross-section. Compressively bonded within said outer sleeve 11 is voided elastomeric insert 12. Compressively within elastomeric insert 12 is positioned inner sleeve member 13 which may have a circular, rectangular or oblong cross-section as shown. Outer sleeve 11 is adapted to be secured to one structural member to be vibrationally isolated from another structural member, for example an automotive engine from the automobile frame.

Elastomeric insert 12, for example, can be made by masterbatching a rubber compound with suitable amounts of activator, retarder and plasticizing agents as well as curing agents, accelerators, antioxidants and fillers. The compound mix is injection, transfer or compression molded and cured to form the elastomeric insert. The insert typically has a Shore A hardness of from 35 to 70 Durometer and, preferably 50 Durometer or less.

Figure 4:
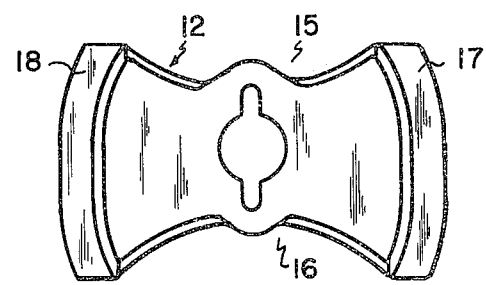
FIG. 4 is a plan view of the voided elastomeric insert used in the bushing shown in FIG. 1.

Referring to FIG. 4, elastomeric insert 12 has a pair of voids or recesses 15 and 16 which (as shown) may be positioned so as to diametrically oppose each other, or which may be angularly offset. Voids 15 and 16 may be identically shaped and sized or have different shapes and/or sizes depending upon their intended usage and spring characteristics. For example, in U.S. Pat. No. 3,147,964, the voids are equally sized and diametrically opposed to provide different isolation characteristics in one radial direction from that on an axis normal to that direction. In U.S. Pat. No. 3,508,745, the voids are angularly offset to provide a triple-rated bushing. Elastomeric insert 12 usually has a pair of abutting surfaces 17 and 18 which compressively engage the inner surfaces of the outer sleeve member 11. However, it is possible that the voids may be provided so as to be adjacent inner sleeve member 13 or intermediately positioned within elastomeric insert 12. While the following description of the presently preferred embodiment is directed to bushings having voids on the outer surface of elastomeric insert 12, the method of assembly is the same with respect to voids located adjacent the inner sleeve or intermediately within the insert. The abutting surfaces of the spacer member would be positioned accordingly.

In assembling the component parts into elastomeric bushing 10, it has been found that high elongation of elastomeric insert 12, preferably of at least 30% and most desirably of 40 to 60%, can be achieved by the utilization of a spacer member. The spacer member is preferably designed to conform to the final shape of the elastomeric insert, that is, the desired shape the voids take after removal of the spacer upon assembly between the inner and outer sleeve members. The spacer can be made of suitable material such as a glass filled nylon, and preferably is adapted to withstand the temperatures encountered in the bonding oven where the assembly is bonded before removal of the spacer member.

Figure 5:
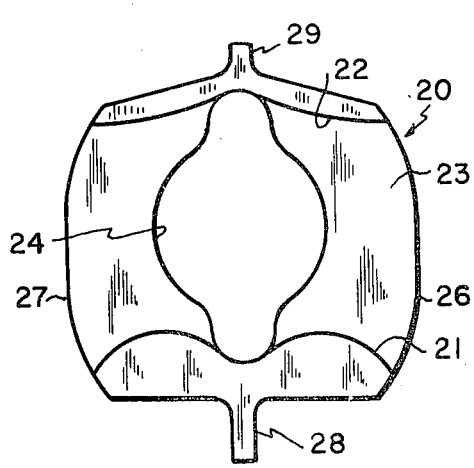
FIG. 5 is a plan view of the spacer member used to achieve high elongation of elastomeric insert shown in FIG. 4 during assembly of the bushing.
Figure 6:
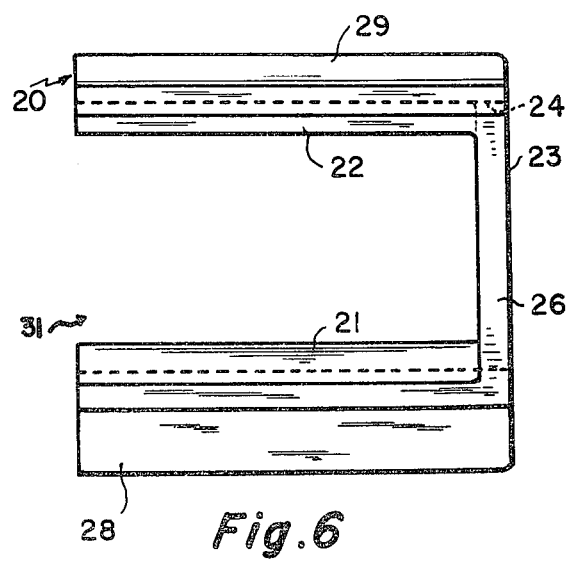
FIG. 6 is an elevation of the spacer member shown in FIG. 5.

In FIGS. 5 and 6, a spacer member 20 is shown which is made in substantial conformance with the final shape configuration of voids 15 and 16 of elastomeric insert 12. Spacer 20 includes a pair of side walls 21 and 22, the inner surfaces of which conform to the final shape of voids 15 and 16 respectively. An end wall 23 is provided having an opening 24 shaped to permit passage of the inner sleeve 13 therethrough. End wall 23 is adapted to abut the upper nesting member during assembly of bushing 10. Edges 26 and 27 of end wall 23 are shaped to abut the inner surface of outer sleeve 11 throughout their length. To reduce the amount of material used in the molding of spacer 20, side walls 21 and 22 are provided with projections 28 and 29, respectively. Projections 28 and 29 are preferably diametrically positioned in the center of their respective side walls and extend the length thereof. Projections 28 and 29 are adapted to abut the inner surface of outer sleeve 11 to position, in cooperation with end wall 23, spacer 20 within outer sleeve 11. Spacer 20 includes an opening 31 through which elastomeric insert 12 and inner sleeve 13 are compressively engaged within outer sleeve 11.

Figure 7:
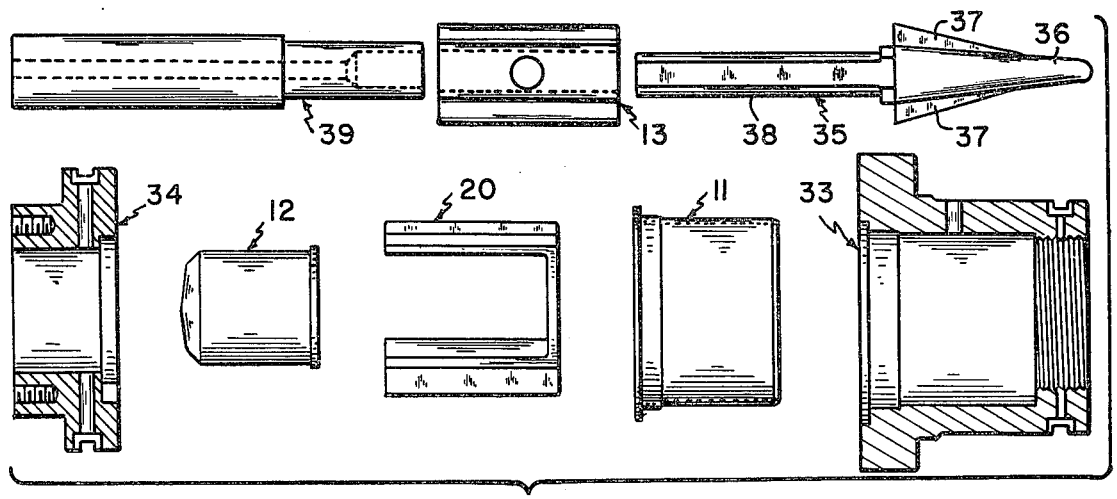
FIG. 7 is an exploded view showing assembly of a bushing using the spacer member of FIGS. 5 and 6.
Figure 8:
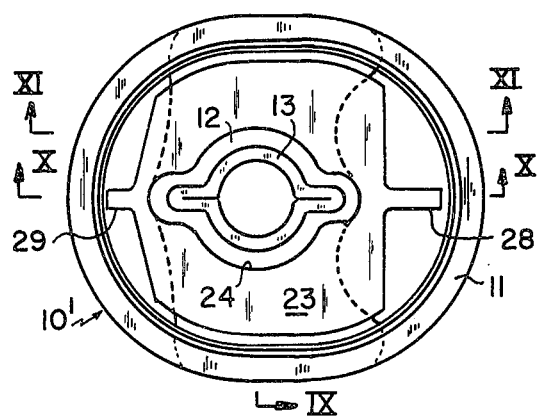
FIG. 8 is a plan view of an assembled bushing prior to removal of the spacer member.
Figure 9:
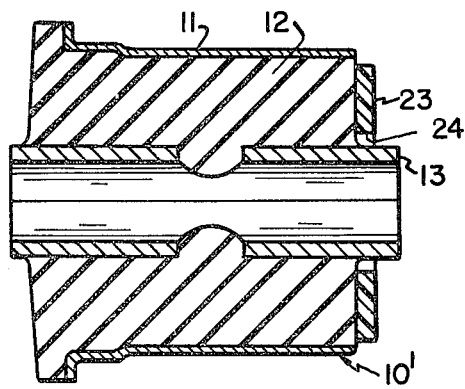
FIGS. 9, 10 and 11 are sectional elevations taken along lines IX—IX, X—X and XI—XI of FIG. 8, respectively.
Figure 10:
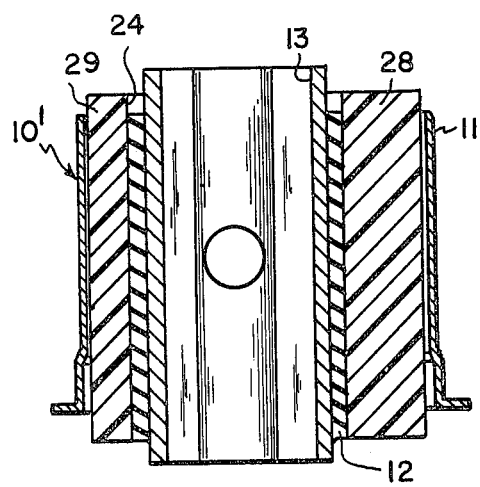
Figure 11:
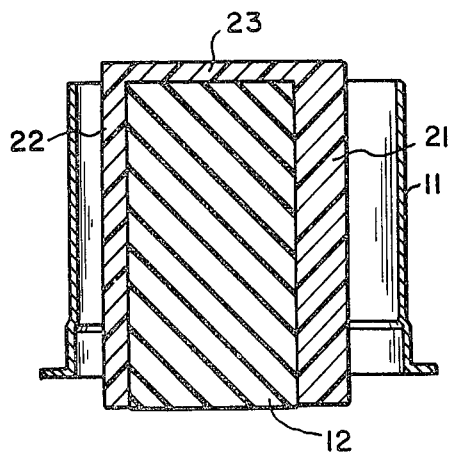

Referring to FIG. 7, an exploded assembly view is shown of the method for assembling the bushing of the present invention. An upper metal nesting member 33, which is part of a vertical or horizontal assembly machine such as shown in U.S. Pat. No. 2,660,780, is used in cooperation with lower metal nesting member 34 to force voided elastomeric insert 12 into outer sleeve 11 and spacer 20 positioned within the outer sleeve. A mandrel 35 having a tapered nose section 36, a pair of ears 37 for use with inner sleeve 13 as shown, and extension 38 for carrying inner sleeve 13 is forced through lower nesting member 34 and the annular opening in voided elastomeric insert 12 by mandrel adapter 39. As mandrel nose 36 exits from the elastomeric insert, inner sleeve 13 is compressively engaged by voided insert 12. Mandrel adapter 39 is withdrawn by reversing the assembly action and mandrel 35 is removed through the upper nest.

The assembled bushing 10', FIGS. 8–11, includes spacer 20 therein. Preferably bushing 10' is then placed in a bonding oven to bond voided elastomeric insert 12 to inner and outer sleeves 13 and 11, respectively. After removal from the bonding oven, spacer 20 is removed to provide a completed bushing 10.

While a presently preferred embodiment of the invention has been shown and described in particularity, it may otherwise be embodied within the scope of the appended claims.

What is claimed is:

1. A method of assembling an elastomeric bushing comprising an elastomeric insert disposed in substantial compressive elongation in excess of 10% between a rigid inner sleeve axially aligned with a rigid outer sleeve, said assembled bushing defining at least one void of selected size and shape axially aligned between said sleeves and extending completely through said bushing, the steps comprising:

a. placing a spacer member substantially the size and shape of said void in a recess defined through the length of said elastomeric insert;

b. compressively inserting said insert together with said spacer member between said sleeves to assemble said bushing; and c. withdrawing said spacer member from said void leaving said void as defined by said spacer member after said bushing is assembled.

2. The method of claim 1 wherein said assembled bushing is heated to bond said insert to said sleeves before said spacer member is removed.

3. The method of claim 1 wherein said assembled bushing is aged before heating.

4. The method of claim 1 wherein the surfaces of said sleeves which are in contact with said insert are coated with an adhesive prior to inserting said insert between said sleeves.

5. The method of claim 1 wherein said insert and said spacer member are compressively inserted within said outer sleeve and said inner sleeve is thereafter compressively inserted within said insert.

* * * * *

UNITED STATES PATENT OFFICE
CERTIFICATE OF CORRECTION

PATENT NO. : 3,928,103
DATED : December 23, 1975
INVENTOR(S) : Gary L. Hipsher & Robert D. Vosburgh It is certified that error appears in the above-identified patent and that said Letters Patent are hereby corrected as shown below:

Column 6, line 1, claim "1" should read --2--

Signed and Sealed this sixteenth Day of March 1976

[SEAL]

Attest:

RUTH C. MASON
*Attesting Officer*

C. MARSHALL DANN
*Commissioner of Patents and Trademarks*